United States Patent [19]

Mamantov

[11] Patent Number: 4,508,795
[45] Date of Patent: Apr. 2, 1985

[54] SODIUM-TETRAVALENT SULFUR MOLTEN CHLOROALUMINATE CELL

[75] Inventor: Gleb Mamantov, Knoxville, Tenn.

[73] Assignee: University of Tennessee Research Corporation, Knoxville, Tenn.

[21] Appl. No.: 578,885

[22] Filed: Feb. 10, 1984

[51] Int. Cl.³ .............................................. H01M 4/36
[52] U.S. Cl. .................................... 429/103; 429/104; 429/199
[58] Field of Search ........................ 429/103, 104, 199

[56] References Cited

U.S. PATENT DOCUMENTS 3,966,491  6/1976  Mamantov et al. ............... 136/6 LF
4,063,005  12/1977  Mamantov et al. ................. 429/103

OTHER PUBLICATIONS

Article reprinted from Journal of the Electrochemical Society, vol. 127, No. 11, Nov. 1980—"The Use of Tetravalent Sulfur in Molten Chloroaluminate Secondary Batteries" by G. Mamantov, R. Marassi, M. Matsunaga, Y. Ogata, J. P. Wiaux and E. J. Frazer.

Article reprinted from the 15th Intersociety Energy Conversion Engineering Conference, Seattle, Washington, Aug. 18–22, 1980, No. 809107—"A New Rechargeable High Voltage Low Temperature Molten Salt Cell" by Gleb Mamantov, R. Marassi, Y. Ogata, M. Matsunaga and J. P. Wiaux.

*Primary Examiner*—Charles F. LeFevour
*Attorney, Agent, or Firm*—Luedeka & Neely

[57] ABSTRACT

A sodium-tetravalent sulfur molten chloroaluminate cell with a $\beta''$-alumina sodium ion conductor having a S-Al mole ratio of above about 0.15 in an acidic molten chloroaluminate cathode composition is disclosed. The cathode composition has an $AlCl_3$-NaCl mole percent ratio of above about 70-30 at theoretical full charge. The cell provides high energy densities at low temperatures and provides high energy densities and high power densities at moderate temperatures.

4 Claims, 1 Drawing Figure

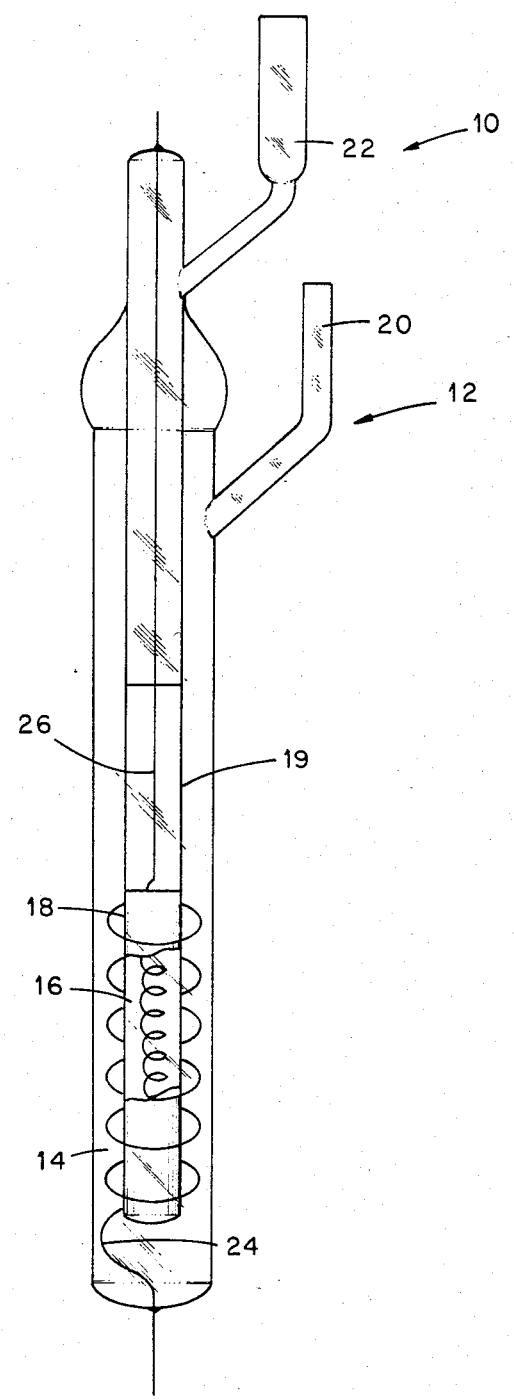

SODIUM-TETRAVALENT SULFUR MOLTEN CHLOROALUMINATE CELL

The United States Government has rights in this invention pursuant to University of California Subcontract 4502810 awarded by the Department of Energy.

This invention relates to molten salt battery systems and more particularly relates to "sulfur-rich" sodium-tetravalent sulfur molten chloroaluminate cells having a $\beta''$-alumina sodium ion conductor.

Many cells have been developed in an attempt to provide rechargeable battery systems for applications where high energy densities are required, for example, in electric or hybrid vehicles, in load leveling systems for utility power plants, and for storage of solar energy. Some of the most promising cells for such applications are several cells utilizing chloroaluminate melts such as those disclosed in U.S. Pat. Nos. 3,966,491 and 4,063,005. Various cells are disclosed including cells having a cathode of sulfur in a molten chloroaluminate electrolyte with the sulfur having various positive oxidation states. Various anodes are disclosed including a sodium anode used in conjunction with a $\beta''$-alumina $Na^+$ ion conductor.

Typical energy densities for known rechargeable sodium-tetravalent sulfur molten chloroaluminate cells having an $AlCl_3$—$NaCl$ melt composition at theoretical full charge of 70—30 mole percent, for operation at 220° C. in the first reduction step, are in the range of 200 W-hr/kg. Usually, power densities are also limited due to the low current densities obtainable from known cells and generally, charging rates are limited. For applications requiring high energy density battery systems, there is a need for cells having both greater energy densities and high power densities.

Known rechargeable sodium-tetravalent sulfur molten chloroaluminate cells, such as those disclosed in U.S. Pat. No. 4,063,005, may successfully be operated during discharge through a first reduction step where S(IV) present as $SCl_3^+$ in the melt is reduced to elemental sulfur present predominantly as $S_8$. To increase energy density of the known cells by more thorough utilization of active materials, attempts have been made to continue operation of the cell through a second reduction step where the elemental sulfur is further reduced to sulfide which is present in the melt as oligomeric $AlSCl$ or oligomeric $AlSCl_2^-$. Difficulties arise in connection with known cells with continued operation into and through the second step. Pronounced voltage oscillations can occur at the end of the first reduction step and the operation has been partially irreversible in the second reduction step in known cells. One approach to solve these problems is to use higher temperatures which decreases the overall efficiency of the system because of the increased energy needed for heating and which is undesirable because of the high vapor pressure of some chloroaluminate melts at higher temperatures.

It is accordingly an object of the present invention to provide a cell for a battery system which provides a higher energy density than that achieved by known cells.

It is a further object of the present invention to provide a rechargeable sodium-tetravalent molten chloroaluminate cell which has a higher energy density than known cells and which is fully reversible throughout the first and second reduction steps.

It is another object of the present invention to produce a sodium-tetravalent molten chloroaluminate cell which provides both high energy densities and high power densities.

These and other objects and advantages of the invention will become more fully apparent as the following description is read in conjunction with the drawing in which:

The drawing is a partially broken-away side view of a typical laboratory cell embodying one form of the present invention.

Generally, in accordance with the present invention, there is provided an improved rechargeable sodium-tetravalent sulfur molten chloroaluminate cell with a $\beta''$-alumina sodium ion conductor having a "sulfur-rich" cathode composition. "Sulfur-rich" refers to a mole ratio of the total sulfur in all oxidation states to the total aluminum in the cathode melt of above about 0.15. In accordance with another aspect of the present invention, the cathode current collector in a sulfur-rich cell is reticulated vitreous carbon. The chloroaluminate melt for use with the present invention is strongly acidic with the $AlCl_3$—$NaCl$ *mole percent ratio of above about* 70—30 mole percent at theoretical full charge.

Cells embodying the present invention provide a dramatic and unexpected increase in energy density for low temperature operation at low current densities and provide an even more surprising increase in power density at moderate temperatures while also providing high energy densities. Highly sulfur-rich cells provide higher open circuit voltages at full charge than any other known rechargeable cells.

The improved sodium-tetravalent sulfur molten chloroaluminate cell includes a cathode compartment for containing the molten sulfur-rich cathode composition and an anode compartment for containing the molten sodium anode material. The $\beta''$-alumina sodium ion conductor is in contact with the contents of both compartments. The compartments are constructed from any material which is chemically inert with respect to the contents of the cell. A borosilicate glass, e.g., Pyrex glass may be used. The anode compartment contains an anode current collector which may be any conductive material which does not react with the molten sodium, e.g., a spiral of tungsten wire may be used. The cathode current collector is a spiral of tungsten wire or is reticulated vitreous carbon. Reticulated vitreous carbon is an open pore "foam" material composed solely of vitreous carbon which was obtained from Fluorocarbon Company. The cathode current collector for cells of the present invention for operation into and through the second reduction step is reticulated vitreous carbon, preferably with a porosity of 45 pores per linear inch. The use of reticulated vitreous carbon as the cathode current collector greatly improves the reversibility of the cell in the second reduction step. Moreover, reticulated vitreous carbon allows for high power density operation in a high energy density cell. The benefits are believed to be due to the larger surface area of reticulated vitreous carbon which minimizes problems related to low solubilities of sulfur or sulfide in the chloroaluminate melt.

Referring to the drawing, there is shown a typical laboratory cell 10 which is constructed in a borosilicate glass tube, e.g., Pyrex, which is designated generally by the numeral 12. The tube 12, which is oriented vertically, contains the cathode compartment 14 in the lower portion of the tube 12. The anode compartment 16 for containing the molten sodium is disposed within the cathode compartment by the use of a tube of β''-alumina 18 which is coaxial with the borosilicate glass tube 12. The β''-alumina tube forms a vessel for the anode compartment 16 and separates the anode compartment 16 from the cathode compartment 14. The β''-alumina tube 18 is sealed to an α-alumina tube or to a specialty glass tube with a coefficient or expansion compatible with β''-alumina, e.g., Corning 7052 glass, designated by the numeral 19 which is then sealed to the borosilicate glass tube 12 near the top of the tube 12. β''-alumina tubes, such as the tube 18 in the cell shown in the drawing, are available from Ceramatec, Inc. A first access and evacuation connection 20 connects to the space above the cathode compartment 14 and provides access to and is used to evacuate the cathode compartment 14. Similarly, a second access the evacuation connection 22 connected to the space above the anode compartment provides access to and is used to evacuate the anode compartment 16. The cathode current collector in the cell shown is a tungsten spiral 24 which extends upwardly through the bottom of the tube 12 and spirals around the β''-alumina tube 18. The tungsten spiral 24 is sealed to the tube 12 where it passes through tube 12. The anode current collector is a tungsten spiral 26 and extends downwardly from the top of the cell 10 into the anode compartment 16 and is sealed where it enters the space above the anode. Before operation, it is preferable to heat the cell for several days or longer at 350°–450° C. under vacuum to drive moisture from the cell. In addition, before construction, it is preferable to prebake the β''-alumina tube at 300°–900° C. for several days to improve wetting of the β''-alumina by molten sodium.

Reticulated vitreous carbon as the cathode current collector is preferably shaped in the form of a tube which snugly encases the β''-alumina tube 18 and thus occupies a substantial portion of the cathode compartment. A tungsten wire is mechanically connected to the reticulated vitreous carbon tube and passes through the tube 12 at a convenient location to provide connection from the current collector to the exterior of the cell.

In an alternate embodiment of the present invention, the cell may be constructed similarly to the cell shown in the drawing but with an "inside out" configuration. The cathode compartment is contained within the tube of β''-alumina 18 and the anode compartment is contained in the borosilicate glass tube 12. Similar current collectors are used with this cell. Reticulated vitreous carbon as the cathode current collector is used as a cylinder disposed within the β''-alumina tube 18.

In a cell according to the present invention, the S—Al mole ratio in the chloroaluminate melt is above about 0.15. It is believed, however, that mole ratios above about 0.3 would provide no additional advantage due to the inability to dissolve or suspend additional sulfur in the melt and the lower conductivity of the mixture. Because of the higher sulfur to aluminum ratios of the present invention, it is necessary to use highly acidic melts for the cells of the present invention. In molten chloroaluminate systems, the Lewis acidity of the melt increases with the $AlCl_3$ content. The acidity of the molten chloroaluminate system may be adjusted by changing the mole percent ratio of $AlCl_3$ to NaCl in the melt. Although several equilibria are involved and the relationship is not linear, the acidity increases as the $AlCl_3$—NaCl mole percent ratio increases with the most acidic composition containing no NaCl (100 mole percent $AlCl_3$). A 50—50 mole percent $AlCl_3$—NaCl melt may be referred to as a "neutral" melt; a NaCl saturated melt at 175° C. having 49.8 mole percent $AlCl_3$ and 50.2 mole percent NaCl is, for example, a basic melt.

The overall reactions occuring in sodium-tetravalent sulfur cell invention written in simplified form are as follows:

First Reduction Step

Second Reduction Step

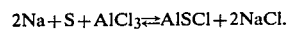

In the cathode compartment of such cells, one mole of S(IV), present in the melt as $SCl_3^+$, is accompanied by the conversion of three moles of $AlCl_3$ to three moles of $AlCl_4^-$ in the first reduction step which decreases the acidity of the melt as the cell is discharged. The melt acidity continues to decrease during the second discharge step as one mole of $AlCl_3$ is consumed for each mole of elemental sulfur that is reduced. Because $SCl_3^+$ is unstable in basic melts, it is necessary for the melt to be sufficiently acidic when the cell is charged in order for the melt to remain acidic as long as tetravalent sulfur is present in the melt. Generally, it is necessary for the melt to have a $AlCl_3$—NaCl mole percent ratio of 70—30 or above at theoretical full charge. Preferably, the $AlCl_3$—NaCl mole ratio is 80—20 or above.

Because highly acidic melts have high vapor pressures, it is preferable to operate cells of the present invention at lower temperatures and to restrict charging to about 90% of full charge rather than complete conversion to S(IV). In addition, cell resistance increases at high charge levels. Generally, cells can be operated at low current densities (less than about 50 mA/cm$^2$ based on the β''-alumina-melt interface surface area) at temperatures of ranging from 220° C. down to as low as a few degrees above the melting point of sodium (105° C.). For high current density operation (greater than 50 mA/cm$^2$ based on the β''-alumina-melt interface surface area), it is necessary to use temperatures of above about 220° C. and to preferably restrict charging to about 80% of full charge.

Sulfur as the active cathode material can be supplied to the cathode compartment as $SCl_3AlCl_4$ to a melt composition having the fully charged $AlCl_3$—NaCl mole percent ratio. Alternately, the sulfur can be supplied as elemental sulfur to a less acidic melt composition so that the melt has the desired acidity at theoretical full charge. An NaCl saturated melt is particularly convenient when the sulfur is added as elemental sulfur since the melt will be acidic when tetravalent sulfur is present in the melt.

The following are specific examples of cells employing features of the present invention:

EXAMPLE I

The cathode composition was prepared by adding 24.1 g $SCl_3AlCl_4$ to 42.6 g $AlCl_3$—NaCl (83.4–16.6 mole percent). The S—Al mole ratio was 0.21. The mixture was placed in the cathode compartment 14 of a cell such as the cell shown in the drawing having a reticulated vitreous carbon cathode current collector having a porosity of 45 pores per linear inch and shaped as a tube which snugly encased the β''-alumina tube which had an outside diameter of 16.6 mm and an inside diameter of 13.4 mm. The effective inside surface area of the $\beta''$-alumina tube in contact with the sodium was 19 cm$^2$. Before construction, the $\beta''$-alumina tube was heated at 350° C. for 14 days under vacuum. 18.8 g of sodium were used in the anode compartment 16. The cell was operated at various temperatures and underwent 108 deep charge/discharge cycles and was in continuous operation for approximately eight months. Table I summarizes parameters of the cell. Figures for energy density are based on all active materials for the process, excluding, however, the mass of $\beta''$-alumina, the cell casing, electrodes and current collectors. Current density figures are based on the effective inside surface area of the $\beta''$-alumina tube.

Table II shows parameters for a cell with identical construction as the above example which is not sulfur rich. The cathode composition was prepared by adding 19.2 g SCl$_3$ AlCl$_4$ in 69.8 g AlCl$_3$—NaCl (66.0—34.0 mole percent) melt (S—Al mole ratio of 0.13).

density of 360 mA/cm$^2$ was achieved for the fourteenth discharge.

EXAMPLE III

The cathode mix consisted of 0.846 g of sulfur and 20.312 g of AlCl$_3$—NaCl (NaCl saturated at 175° C.) inside the $\beta''$-alumina tube of an "inside out" cell similar to the cell shown in the drawing. The S-Al mole ratio was 0.25. A tungsten spiral was used as the cathode current collector. The quantity of sodium in the anode compartment was approximately 7.6 g. The $\beta''$-alumina tube had an outside diameter of 13.8 mm and an inside diameter of 10.4 mm and had been heated under vacuum for four days at 900° C. The effective inside surface area of the $\beta''$-alumina tube was 50 cm$^2$. The finished cell was heated under vacuum for nineteen days at 450° C. before operation. With this cell an energy density of 439 W-hr/kg for the first step at 20 mA/cm$^2$ was obtained during the third discharge at 200° C. As in Exam-

TABLE I

| Temperature °C. | Current density mA/cm$^2$ | | 1st Plateau | | | | | 2nd Plateau | | | | | Overall | |
|---|---|---|---|---|---|---|---|---|---|---|---|---|---|---|
| | DC | CH | Average cell voltage V | | Energy efficiency % | Energy density W-hr/kg | Utilization, % | Average cell voltage, V | | Energy efficiency % | Energy density W-hr/kg | Utilization, % | Energy density W-hr/kg | Utilization, % |
| | | | DC | CH | | | | DC | CH | | | | | |
| 180 | 10.6 | 5.3 | 3.61 | 4.78 | 75.5 | 348 | 84.5 | 2.49 | 2.95 | 84.3 | 107 | 77.8 | 455 | 82.3 |
| 200 | 21.2 | 10.6 | 3.62 | 4.43 | 81.6 | 354 | 85.7 | 2.50 | 2.98 | 83.9 | 103 | 74.6 | 457 | 82.0 |
| 220 | 21.2 | 10.6 | 3.73 | 4.31 | 86.4 | 306 | 72.3 | 2.51 | 2.99 | 83.9 | 111 | 80.8 | 417 | 75.1 |
| 250 | 21.2 | 10.6 | — | — | — | — | — | 2.58 | 2.89 | 89.2 | 126 | 89.6 | — | — |

TABLE II

| Temperature °C. | Current density mA/cm$^2$ | | 1st Plateau | | | | | 2nd Plateau | | | | | Overall | |
|---|---|---|---|---|---|---|---|---|---|---|---|---|---|---|
| | DC | CH | Average cell voltage V | | Energy efficiency % | Energy density W-hr/kg | Utilization, % | Average cell voltage, V | | Energy efficiency % | Energy density W-hr/kg | Utilization, % | Energy density W-hr/kg | Utilization, % |
| | | | DC | CH | | | | DC | CH | | | | | |
| 220 | 17.4 | 8.7 | 3.32 | 4.61 | 72.1 | 206 | 87.6 | 2.24 | 3.21 | 69.7 | 72 | 90.8 | 278 | 88.7 |

A comparison of Tables I and II show that the energy density obtained in the "sulfur-rich" cell is significantly higher than in a cell which is not "sulfur rich". Even more dramatic increases are observed when the cell is compared to a cell having a tungsten cathode current collector which is not "sulfur rich".

EXAMPLE II

The cathode mix was prepared by adding 4.440 g of elemental sulfur to 106.298 g of AlCl$_3$—NaCl (NaCl saturated at 175° C.) in a cathode compartment 14 of a cell such as the cell shown in the drawing. The S-Al mole ratio was 0.25. The quantity of sodium in the anode compartment 16 was 11.45 g. A reticulated vitreous carbon current collector having a porosity of 45 pores per linear snugly encased the $\beta''$-alumina tube having an outside diameter of 10.6 mm and an inside diameter of 7.4 mm which had been heated under vacuum at 900° C. for four days. The cell was heated under vacuum for three weeks at 450° C. before operation. The effective inside surface area of the $\beta''$-alumina tube was 21 cm$^2$. The sodium anode compartment 16 employed a tungsten spiral as the anode current collector. The cell was operated mostly at 250° C. for 22 cycles. An energy density of 442 W-hr/kg for both reduction steps at 20 mA/cm$^2$ was achieved for the fifth discharge. The energy density is based on all active materials, excluding, however, the weight of the current collectors, $\beta''$-alumina, and the cell casing. A maximum power density of 788 mW/cm$^2$ (corresponding to the effective inside area of $\beta''$-alumina tube) at the current ples I and II, the energy density value is based on active materials only. Current density was calculated from the effective inside surface area.

EXAMPLE IV

The cathode mix consisted of 0.281 of sulfur and 6.736 g of AlCl$_3$—NaCl (NaCl saturated at 175° C.) inside the $\beta''$-alumina tube of an "inside out" cell similar to the cell shown in the drawing. The S—Al mole ratio was 0.25. The $\beta''$-alumina tube had an outside diameter of 10.5 mm and an inside diameter of 7.5 mm. The effective inside surface area of the $\beta''$-alumina tube was 23.2 cm$^2$. A reticulated vitreous carbon cathode current collector was used in the form of a cylinder. The quantity of sodium in the anode compartment was approximately 7.6 g. The $\beta''$-alumina tube was heated at 300° C. under vacuum for three days prior to construction and the finished cell was heated at 460° C. under vacuum for fourteen days. An energy density of 340 W-hr/kg for the first step at 20 mA/cm$^2$ and 250° C. was obtained for the second discharge. A maximum power density of 505 mW/cm$^2$ at 250 mA/cm$^2$ (based on the effective inside surface area) was achieved for the fourth discharge; this value corresponds to a mass power density of 1579 W/kg. Both energy density and mass power density are based on active materials only.

The improved sodium-tetravalent sulfur molten chloroaluminate cell of the present invention having the "sulfur-rich" cathode composition achieves high energy densities at low temperatures and provides high power densities in addition to achieving high energy densities at moderate temperatures. The "sulfur-rich" cell including the reticulated vitreous carbon cathode current collector solves problems associated with operation of the sodium-tetravalent sulfur cells into and through the second reduction step. The unexpected increase in energy density provided by a cell of the present invention makes the cell suitable for many applications where a high energy density cell is required. At moderate temperatures, a sulfur-rich cell can surprisingly be discharged at high current densities. This result makes the cell particularly suitable for high power density applications.

While preferred embodiments of the present invention have been shown and described, it will be understood that there is no intent to limit the invention by such disclosure, but rather, it is intended to cover all modifications and alternate embodiments falling within the spirit and scope of the invention as defined in the appended claims.

What is claimed is:

1. An improved rechargeable sodium-tetravalent sulfur molten chloroaluminate cell having a cathode compartment containing a molten cathode composition including sulfur in a chloroaluminate melt and a cathode current collector, an anode compartment containing molten sodium and an anode current collector, and a $\beta''$-alumina sodium ion conductor in contact with said molten cathode composition and said molten sodium, the improvement comprising: a sulfur to aluminum mole ratio in said cathode composition of above about 0.15, whereby said improved cell operates at low temperatures to provide high energy densitites and operates at moderate temperatures to provide high power densities and high energy densities.

2. The improved cell of claim 1 wherein said cathode current collector comprises reticulated vitreous carbon, whereby said cell is operable into and throughout a second reduction step in which sulfur is reduced to sulfide.

3. The improved cell of claim 1 wherein said cathode composition has a $AlCl_3$—$NaCl$ mole percent ratio of above about 70—30 at theoretical full charge.

4. The improved cell of claim 1 wherein said cathode composition has a $AlCl_3$—$NaCl$ mole percent ratio of above about 80—20 at theoretical full charge.

* * * * *

UNITED STATES PATENT AND TRADEMARK OFFICE
CERTIFICATE OF CORRECTION

PATENT NO. : 4,508,795
DATED : April 2, 1985
INVENTOR(S) : Gleb Mamantov

It is certified that error appears in the above-identified patent and that said Letters Patent is hereby corrected as shown below:

Column 2, line 23 "-NaCl mole percent ratio of above about" should not be in smaller type.

Column 3, line 17, "the" should be -- and --.

Column 5, line 53, after " linear", the word -- inch -- should appear.

Signed and Sealed this

Sixteenth Day of July 1985

[SEAL]

Attest:

DONALD J. QUIGG

Attesting Officer     Acting Commissioner of Patents and Trademarks